United States Patent

Burns

Patent Number: 5,945,234
Date of Patent: Aug. 31, 1999

[54] METAL-AIR CATHODE CAN HAVING REDUCED CORNER RADIUS AND ELECTROCHEMICAL CELLS MADE THEREWITH

[75] Inventor: John David Burns, Durham, United Kingdom

[73] Assignee: Rayovac Corporation, Madison, Wis.

[21] Appl. No.: 08/779,340

[22] Filed: Jan. 6, 1997

Related U.S. Application Data

[63] Continuation of application No. 08/435,770, May 5, 1995.

[51] Int. Cl.$^6$ ...................................................... H01M 2/04
[52] U.S. Cl. ............................ 429/66; 429/174; 429/175; 429/185
[58] Field of Search ............................ 429/66, 171, 172, 429/173, 174, 175, 176, 185; 206/703, 705

[56] References Cited

U.S. PATENT DOCUMENTS

| | | | |
|---|---|---|---|
| Re. 31,413 | 10/1983 | Jaggard | 429/27 |
| 3,372,060 | 3/1968 | Platner . | |
| 3,746,580 | 7/1973 | Aker et al. . | |
| 4,139,683 | 2/1979 | Sauer et al. | 429/219 |

(List continued on next page.)

FOREIGN PATENT DOCUMENTS

| | | | |
|---|---|---|---|
| 943185 | 3/1974 | Canada | 319/112 |
| 982653 | 1/1976 | Canada | 319/106 |
| 1125363 | 6/1982 | Canada | 319/32 |
| 1185318 | 4/1985 | Canada | 319/100 |
| 1248173 | 1/1989 | Canada | 319/32 |
| 2100391 | 1/1995 | Canada . | |
| 0560579A1 | 9/1993 | European Pat. Off. . | |
| 55-080265 | 6/1980 | Japan . | |
| 58-161273 | 9/1983 | Japan . | |
| 58-198861 | 11/1983 | Japan . | |
| 59-014251 | 1/1984 | Japan . | |
| 59-054170 | 3/1984 | Japan . | |
| 62-012060 | 1/1987 | Japan . | |
| 63-62170 | 3/1988 | Japan . | |
| S63-294672 | 12/1988 | Japan . | |
| H1-151150 | 6/1989 | Japan . | |
| NASA TT-21273 | 1/1993 | Japan . | |
| NASA TT-21274 | 1/1993 | Japan . | |
| NASA TT-21328 | 3/1993 | Japan . | |
| NASA TT-21529 | 12/1993 | Japan . | |
| NASA TT-21530 | 12/1993 | Japan . | |
| 2010002 | 6/1979 | United Kingdom . | |
| 2060985 | 5/1981 | United Kingdom . | |
| 2110464 | 6/1983 | United Kingdom . | |

OTHER PUBLICATIONS

Harris, Frank M. and Schimpf, Mark J., "Zinc–Air Rechargeable Batteries For Mobile Power", 1994, pp. 146–151.

Bender, Steven F., Cretzmeyer, John W. and Reise, Terrence F., "Zinc–Air Cells", Handbook of Batteries, 1995, Chapter 13, pp. 13.1–13.5.

*Primary Examiner*—Stephen Kalafut
*Attorney, Agent, or Firm*—Michael L. Winkelman; Thomas D. Wilhelm; Brian R. Tumm

[57] ABSTRACT

This invention pertains to electrode cans and metal air electrochemical cells made with the electrode cans. The invention provides improved structure, and methods for making the outer edge of the closed end of the can at the joinder of the closed end of the can with an side wall extending from the closed end. A substantially flat portion of the outer surface of the closed end of the can extends outwardly of the inner surface of the side wall. The electrochemical cells are assembled using improved assembly methods. Button-type electrochemical cells made using the invention are free of the inward dishing common to especially cathode cans in such button cells.

12 Claims, 6 Drawing Sheets

U.S. PATENT DOCUMENTS

| | | | |
|---|---|---|---|
| 4,189,526 | 2/1980 | Cretzmeyer et al. | 429/13 |
| 4,209,574 | 6/1980 | Reutschi | 429/133 |
| 4,254,593 | 3/1981 | Paulfeuerborn | 51/425 |
| 4,262,062 | 4/1981 | Zatsky | 429/27 |
| 4,292,383 | 9/1981 | Di Palma et al. | 429/219 |
| 4,297,249 | 10/1981 | Przybyla et al. | 252/518 |
| 4,298,506 | 11/1981 | Przybyla et al. | 252/518 |
| 4,316,945 | 2/1982 | Marcham et al. | 429/222 |
| 4,333,993 | 6/1982 | Gibbard | 429/27 |
| 4,343,869 | 8/1982 | Oltman et al. | 429/27 |
| 4,369,568 | 1/1983 | Dopp | 29/623.2 |
| 4,404,266 | 9/1983 | Smilanich | 429/27 |
| 4,591,539 | 5/1986 | Oltman et al. | 429/27 |
| 4,649,090 | 3/1987 | Oltman et al. | 429/29 |
| 4,656,104 | 4/1987 | Tucholski | 429/185 |
| 4,687,714 | 8/1987 | Oltman et al. | 429/27 |
| 4,791,034 | 12/1988 | Dopp | 429/27 |
| 4,822,698 | 4/1989 | Jackovitz | 429/27 |
| 4,861,688 | 8/1989 | Miura et al. | 429/206 |
| 4,865,932 | 9/1989 | Masuda et al. | 429/194 |
| 4,957,826 | 9/1990 | Cheiky | 429/27 |
| 5,069,986 | 12/1991 | Dworkin | 429/27 |
| 5,069,989 | 12/1991 | Uetani et al. | 429/164 |
| 5,279,905 | 1/1994 | Mansfield, Jr. et al. | 429/27 |
| 5,308,711 | 5/1994 | Passaniti et al. | 429/29 |
| 5,432,027 | 7/1995 | Tuttle et al. | 429/127 |
| 5,458,988 | 10/1995 | Putt | 429/27 |
| 5,494,495 | 2/1996 | Tuttle | 29/623.2 |
| 5,536,596 | 7/1996 | Lake | 429/162 |
| 5,554,452 | 9/1996 | Delmolino et al. | 429/10 |
| 5,580,674 | 12/1996 | Tuttle et al. | 429/66 |

METAL-AIR CATHODE CAN HAVING REDUCED CORNER RADIUS AND ELECTROCHEMICAL CELLS MADE THEREWITH

This application is a continuation of application Ser. No. 08/435,770, filed May 5, 1995.

FIELD OF THE INVENTION

This invention relates to alkaline electrochemical cells having metallic anodes and air cathodes, commonly known as metal-air cells. More particularly, this invention relates to the structure of the cathode can and the anode can, and to the methods and apparatus used to form the cans, and to assemble the cans to each other in making an electrochemical cells.

BACKGROUND OF THE INVENTION

The growth in use of small electrically-powered devices has increased the demand for very small metal-air electrochemical cells. Such small cells are usually disc-like or pellet-like in appearance, and are about the size of garment buttons. These cells generally have diameters ranging from less than 0.25 inch up to about 1.0 inch, and height ranging from less than 0.15 inch up to about 0.60 inch. The small size, and the limited amount of electrochemically reactive material which can be contained in these small metal-air cells result in considerable attention being directed to improving the efficiency and completeness of the power generating electrochemical reactions which occur therein, as well as to increasing the amount of reactive material which can be placed into the cell.

In general, metal-air cells convert atmospheric oxygen to hydroxyl ions in the air cathode of the cell. The hydroxyl ions then migrate to the anode, where they cause the metal contained in the anode to oxidize. Usually the active anode material in such cells comprises zinc.

More particularly, the desired reaction at a metal-air cell air cathode involves the reduction of oxygen, the consumption of electrons, and the production of hydroxyl ions, the hydroxyl ions being free to then migrate through the electrolyte toward the anode, where oxidation of zinc may occur, forming zinc oxide.

In most metal-air cells, air enters the cell through one or more ports in the cell. The ports extend through the bottom of the cathode can, and may be immediately adjacent the cathode assembly, or may be separated from the cathode assembly by an air chamber or an air diffusion member.

In any such arrangements, the port facilitates the movement of air into the cathode assembly. At the cathode assembly, the oxygen in the air reacts with water, as a chemically reactive participant in the electrochemical reaction of the cell, and thereby forms the hydroxyl ions.

In order for the electrochemical cell to survive normal conditions encountered in fabrication and use of the cell, the respective structural components of the cell must be able to withstand the normal conditions of fabrication and use, both individually and in combination. The main structural components are the anode can and the cathode can, plus an intervening seal which provides support between the anode can and the cathode can.

In general, the size of any given cell is limited by the inside dimensions of the space provided in the article in which the cell will operate. For example, the size of a hearing aid cell is limited to the internal dimensions of the cavity in the hearing aid appliance. The internal dimensions of the cavity are determined by the hearing aid manufacturer, not the power cell manufacturer.

Thus, any given appliance includes a limited amount of gross space/volume allotted to occupancy by the electrochemical cell which powers the appliance. That gross space is ultimately divided according to three competing, but supportive functions. A first and minimal portion of the gross space is used to provide clearance between the interior elements of the space and the exterior elements of the electrochemical cell. A second portion of the gross space is occupied by the structural and otherwise non-reactive elements of the electrochemical cell. The third portion of the gross space is occupied by the electrochemically reactive materials of the electrochemical cell. Since Since the overall electrochemical capacity of any electrochemical cell is to some extent determined by the quantity of electrochemically reactive materials which can be loaded into the cell, it is important to maximize the volume of the space devoted to containing the reactive materials. It is correspondingly important to minimize the portions of the space that are used for providing clearance for the cell, and for providing structural support and other non-reactive elements within the cell.

Normal conditions of fabrication of the cell place significant structural stresses on both the anode can and the cathode can. Specifically, when the anode can and the cathode can are assembled to each other, a force pushing the cathode can toward the anode can may be used to correspondingly crimp the distal edge of the cathode can sidewall against the anode can and the intervening seal. An opposing force may be exerted on the anode can as part of the assembly process.

The physical properties of the structural elements of the is cell, namely the anode can and the cathode can, must be strong enough to withstand especially the opposing forces used in assembling and closing the cell. Thus, the respective enclosing top, bottom, and side walls of the anode can and the cathode can must be strong enough to tolerate the assembly process without collapsing. Using conventional can structures and closure processes has, prior to this invention, suggested that the thickness of the can side walls be of the order of at least 0.008 inch in order for the cans to predictably tolerate the assembly process. If, however, the thickness of the side walls could be reduced, that would release additional internal volume in the cell for use in holding the electrochemically reactive material, e.g. metal anode material.

A further problem experienced with electrochemical cells of the "button-type" construction is that the bottom of the cathode can tends to become dished-in/concave during closing of the cell at final assembly. This problem is related to thickness of the metal used for fabricating the cathode can, and becomes more acute as one reduces the thickness of the metal.

It is an object of this invention to provide improved electrode can structure, especially cathode can structure, for an electrochemical cell by providing improved structure of the can at the corner joining the bottom of the can to a corresponding sidewall of the can.

It is another object to provide improved cathode can structure for a metal-air electrochemical cell, by providing improved structure of the can at the corner joining the bottom of the can to a corresponding side wall of the can.

It is yet another object to provide an electrode can having a bottom, and a side wall extending upwardly from the bottom, wherein force can be applied upwardly on the flat surface of the bottom of the can, and can be transmitted away from the bottom in a direct line through a side wall of the can and parallel to an inner surface of the side wall.

It is yet another object to provide an electrochemical cell wherein the cathode can, the anode can, or both, include improved structure of the respective can at the corner joining the closed end of the respective can to side wall of the respective can.

It is still another object to provide improved methods for forming the corner between the closed end of the respective can and the corresponding side wall of the can.

It is a further object to provide improved methods for assembling an anode, including an anode can, to a cathode, including a cathode can, to thus make a button-type electrochemical cell, including closing the cell so made by crimping the distal edge of the cathode side wall against the anode can and an intervening seal, while exerting a limited opposing force on the anode can.

SUMMARY OF THE DISCLOSURE

Some of the objects are obtained in a first family of embodiments comprehending an electrode can for use in an electrochemical cell, the electrode can comprising a bottom, having a first inner surface, and a first outer surface having a substantially flat portion extending radially outwardly to a first outer perimeter of the first outer surface; and at least one side wall extending upwardly from the bottom, the at least one side wall having a second outer surface and a second inner surface, the substantially flat portion of the first outer surface of the bottom extending radially outwardly of the second inner surface of the at least one side wall.

In preferred ones of the embodiments, the outer perimeter of the first outer surface of the bottom is substantially confined radially outwardly of the second inner surface of the at least one side wall.

Preferred embodiments further include an intermediate element of the can extending between the bottom and the at least one side wall, the intermediate element comprising a curvilinear third outer surface extending between the outer perimeter of the first outer surface of the bottom and the second outer surface of the at least one side wall, the curvilinear third outer surface being substantially confined radially outwardly of the second inner surface of the at least one side wall.

Preferably, the substantially flat portion covers substantially the entirety of the first outer surface of the bottom.

Where the electrode can includes the intermediate element, the bottom may further comprise a first inner perimeter of the first inner surface, and the intermediate element comprises a curvilinear third inner surface extending between the first inner perimeter of the first inner surface and the second inner surface of the at least one side wall, the curvilinear third inner surface describing a curvature having an average radius of less than 0.125 mm, preferably no more than 0.050 mm, more preferably no more than 0.025 mm. Most preferably, the third inner surface represents a sharp corner at the joinder of the first and second inner surfaces.

Preferred average thickness for the at least one side wall is no greater than 0.175 mm, preferably no greater than 0.125 mm, the bottom preferably having corresponding thickness.

Preferred application for the electrode can of the invention is as a cathode can, although use as an anode can is also contemplated.

Where the intermediate element is used, the intermediate element is typically work-hardened as respects the bottom and the at least one side wall.

In a second family of embodiments, the invention comprehends an electrode can for use in an electrochemical cell, the electrode can comprising a bottom, having a first inner surface, and a first outer surface having a substantially flat portion extending radially outwardly to a first outer perimeter of the first outer surface; and at least one side wall extending upwardly; away from the bottom, the at least one side wall having a second outer surface and a second inner surface, the bottom and the at least one side wall being juxtaposed with respect to each other such that a force directed against the substantially flat portion of the first outer surface of the bottom can be transmitted away from the bottom in a straight line extending through the at least one side wall and parallel to the second inner surface.

In a third family of embodiments, the invention comprehends an electrochemical cell, comprising an anode, the anode comprising an anode can and electrochemically reactive anode material; a cathode, the cathode comprising a cathode can and a cathode assembly inside the cathode can, the cathode can comprising (i) a bottom, having a first inner surface, and a first outer surface having a substantially flat portion extending radially outwardly to a first outer perimeter of the first outer surface, and (ii) at least one side wall extending upwardly from the bottom, the at least one side wall having a second outer surface and a second inner surface, the substantially flat portion of the first outer surface of the bottom extending radially outwardly of the second inner surface of the at least one side wall; and an electrically insulating seal between the anode and the cathode.

In preferred ones of the embodiments of the electrochemical cell, the outer perimeter of the first outer surface of the bottom is substantially confined radially outwardly of the second inner surface of the at least one side wall.

Preferred electrochemical cells include an intermediate element of the cathode can extending between the bottom and the at least one side wall, the intermediate element comprising a curvilinear third outer surface extending between the outer perimeter of the first outer surface of the bottom and the second outer surface of the at least one side wall, the curvilinear third outer surface being substantially confined radially outwardly of the second inner surface of the at least one side wall.

In the electrochemical cell, the substantially flat portion of the bottom of the cathode can preferably covers substantially the entirety of the first outer surface of the bottom.

The side wall of the cathode can preferably has an average thickness no greater than 0.175 mm, preferably no greater than 0.125 mm, the bottom of the cathode can preferably having corresponding thickness.

Where the intermediate element is used in the cathode can, the intermediate element is typically work-hardened with respect to the bottom of the cathode can and with respect to the at least one side wall of the cathode can.

In a fourth family of embodiments, the invention comprehends a method of making an electrochemical cell comprising an open-ended anode, received in an open-ended cathode, and an electrically insulating seal between adjacent elements of the anode and the cathode, the anode including an anode can and reactive anode material, the cathode including a cathode can and a cathode assembly inside the cathode can. The method comprises the steps of fabricating a cathode can having (i) a bottom, including a first inner surface, and a first outer surface having a substantially flat portion extending radially outwardly to a first outer perimeter of the first outer surface, and (ii) at least one side wall extending upwardly from the bottom to a distal edge thereof, the at least one side wall having a second outer surface and a second inner surface, the first outer perimeter of the first outer surface of the bottom extending radially outwardly of the second inner surface of the at least one side wall; placing a cathode subassembly in the cathode can formed in the previous step, to make the cathode; selecting a suitable anode for use with the cathode made in the previous step; placing the anode and cathode in juxtaposed relation to each other, with the seal member disposed in position for being assembled between adjacent elements of the anode and the cathode; and urging the cathode toward the anode and against a crimping die element with a first force sufficient to bring the anode into assembled relation inside the cathode can, with the seal between adjacent elements of the anode and the cathode, and to concurrently crimp the distal edges of the at least one side wall of the cathode can, through use of the crimping die element, against the seal and against the anode, to thereby join the cathode to the anode in assembling the electrochemical cell; and while urging the cathode against the crimping die element and crimping the distal edges of the cathode can against the seal and the anode, urging the anode can toward the cathode with a force of no more than 135 pounds.

Preferably, the force used in urging the anode can toward the cathode is no more than 70 pounds, more preferably no more than 45 pounds, most preferably no more than about 30 pounds.

In a fourth family of embodiments, the invention comprehends a method of making an electrode can for use in a metal-air electrochemical cell, the electrode can having a bottom, at least one side wall extending upwardly from the bottom, and an intermediate element extending between the bottom and the at least one side wall, the bottom having a first inner surface and a first outer surface, the first outer surface having a substantially flat portion extending radially outwardly to a finished outer perimeter of the first outer surface, the at least one side wall having a second inner surface defining a finished inner perimeter and a second outer surface defining a finished outer perimeter, the electrode can having a finished depth, the substantially flat portion of the bottom extending radially outwardly of the second inner surface of the at least one side wall. The method comprises the steps of fabricating a metal can pre-form, the can pre-form having an inside surface and an outside surface, defined by a pre-form bottom, and at least one pre-form side wall extending upwardly from the pre-form bottom, the pre-form bottom having a first pre-form inner surface, a pre-form first outer surface, and a pre-form first outer perimeter, the at least one pre-form side wall having a pre-form second inner surface and a pre-form second outer surface, a pre-form intermediate element extending between the pre-form bottom and the at least one pre-form side wall, the at least one pre-form sidewall comprising a pre-form inner perimeter extending about the pre-form first inner surface thereof, and a pre-form second outer perimeter extending about the pre-form second outer surface thereof, the pre-form can having a pre-form depth, the pre-form intermediate element comprising a pre-form curvilinear third outer surface extending between the pre-form second outer surface of the at least one pre-form side wall and the pre-form first outer perimeter of the pre-form bottom, a pre-form curvilinear third inner surface extending between the pre-form second inner surface of the at least one pre-form side wall and the pre-form first inner surface of the pre-form bottom, the pre-form curvilinear third outer surface extending inwardly of the pre-form second inner surface, such that a force directed against the bottom of the pre-form can can be transmitted away from the bottom, and into the pre-form at least one side wall in a straight line only where the line is transverse to the pre-form second inner surface of the pre-form at least one side wall; and press-forming the pre-form can so fabricated in a pressing step to make the finished cathode can having the finished dimensions, comprising (i) forming the can pre-form on the inside surface thereof with a first die element of a die set, the first die element comprising a small radius edge disposed against the pre-form curvilinear third inner surface to thereby reduce the pre-form curvilinear third inner surface to an average radius of no more than 50 microns, and (ii) concurrently forming the can pre-form on the outside surface thereof with a second die element of the die set, to re-shape the pre-form curvilinear third outer surface, and to thereby make the curvilinear third outer surface to be disposed substantially entirely outside the finished inner perimeter of the at least one side wall, such that a force directed against the bottom of the can can be transmitted away from the bottom, and into the at least one side wall, in a straight line parallel to the second inner surface of the at least one side wall.

It is preferred that fabricating the cathode can from the pre-form to the finished dimensions include reducing the pre-form curvilinear third inner surface to an average radius of no more than 0.025 mm.

In generally preferred embodiments, the method includes press forming the pre-formed workpiece such that the first and second elements of the die set are concurrently in intimate relationship with substantially the entirety of opposing inner and outer surfaces of the workpiece. The method typically results in a pre-form can wherein a force directed perpendicular to the bottom of the pre-form can imparts a net bending moment to the bottom of the pre-form can, with respect to the pre-form at least one side wall, and wherein a corresponding force directed perpendicular to the bottom of the finished cathode can is transferred to the at least one side wall without imparting a net bending moment to the bottom of the can.

DETAILED DESCRIPTION OF THE ILLUSTRATED EMBODIMENTS

Figure 1:
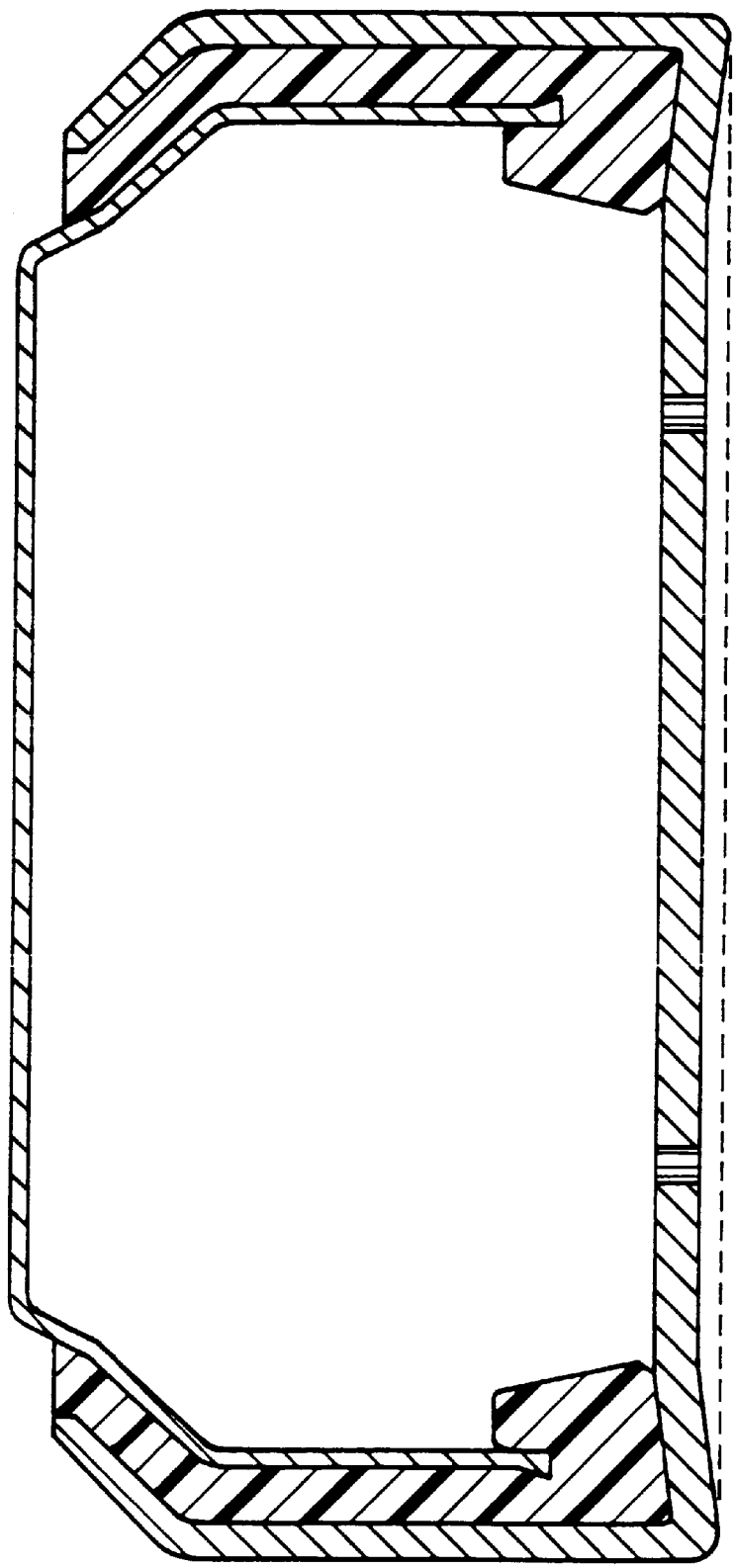
FIG. 1 shows a cross section of an assembly of a cathode can, an anode can, and a seal, illustrating the concavity typical of prior art cathode cans.
Figure 1A:
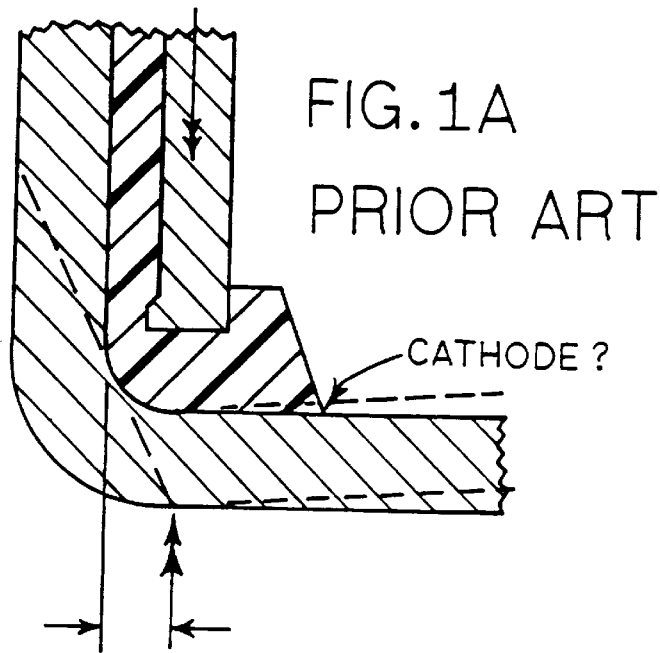
FIG. 1A is an enlarged fragmentary cross-section, showing the corner structure of the prior art cathode can illustrated in FIG. 1.

FIGS. 1 and 1A show a cross section of a prior art assembly of a cathode can, an anode can, and a seal. The dashed line in FIG. 1 represents a straight line across the cathode can between elements of the outer perimeter of outer surface of the bottom of the cathode can, which straight line would be coincident with a flat bottom on the cathode can. The solid line next above the dashed line represents the actual outer surface of the bottom of the cathode can. FIG. 1 illustrates the phenomenon common in cells of the prior art, wherein the bottom of the cathode can is permanently displaced upwardly by the force used in joining the cathode and the anode at final assembly of the cell. Such displacement, of course, reduces the usable volume inside the cell, with corresponding reduction in total cell discharge capacity.

Figure 2:
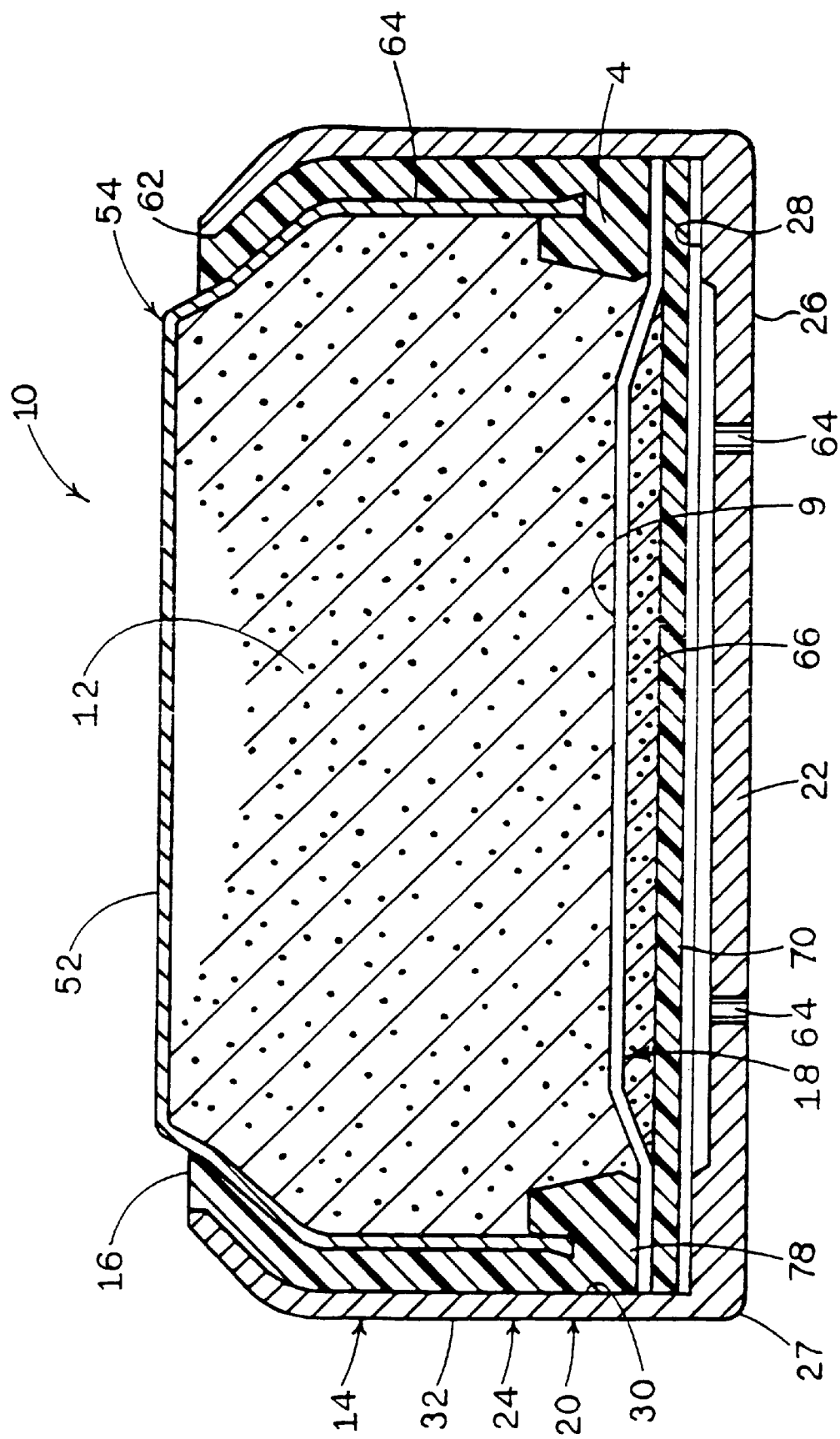
FIG. 2 shows a cross section of an electrochemical cell of the invention.
Figure 2A:
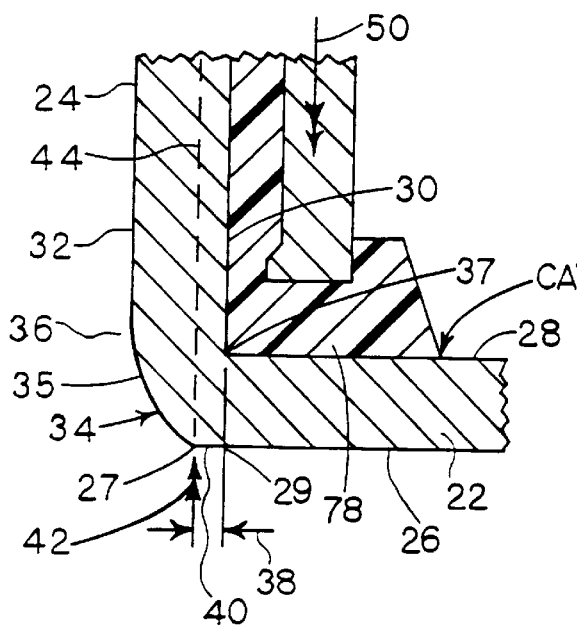
FIG. 2A is an enlarged fragmentary cross-section, showing the ideal corner structure of the cathode can of the invention illustrated in FIG. 2.

FIGS. 2 and 2A generally represent the improved electrode cans, and corresponding electrochemical cells, provided by the invention. As shown in FIGS. 2 and 2A, the cell can be closed, and the cathode can crimped about the anode can at final assembly, while maintaining flat the outer surface of the bottom of the cathode can.

Referring now by characters of reference, FIGS. 2 and 2A generally represent a cross-section of a metal-air cell 10, preferably a zinc-air cell, of the present invention. The negative electrode 12, also referred to as the anode, is electrically insulated from the positive electrode 14, also referred to as the cathode, by a nylon or similar seal 16.

Cathode 14 is generally comprised of a cathode assembly 18, contained within cathode can 20. Cathode can 20 has a bottom 22, and circumferential upstanding side wall 24 extending upwardly from the bottom.

The bottom 22 typically has an outer surface 26. At least a portion of the outer surface 26 is substantially flat, the substantially flat portion extending to an outer perimeter 27, best seen in FIG. 2A. Preferably, the entirety of the outer surface 26 is flat. Bottom 22 further has a generally flat inner surface 28, disposed opposite outer surface 26. Similarly, the side wall 24 has inner surface 30 and outer surface 32, the inner and outer surfaces 30, 32 extending about the circumference of the can, and defining the side wall therebetween.

The side wall 24 is joined to the bottom 22 of the can by intermediate element 34. See FIG. 2A. The outer surface 35 of intermediate element 34 extends, from its lower end at outer perimeter 27 of outer surface 26 of bottom 22, to its upper end 36 which joins the outer surface 32 of the side wall 24 in a generally vertical orientation. The inner surface 37, if any, of the intermediate element 34 is represented at the joinder of the inner surface 28 of the bottom 22 and the inner surface 30 of the side wall 24. In preferred embodiments of the invention, the inner surfaces 28 and 30 come together at a sharp corner, such that the inner surface 37 is of nominal dimension. To the extent the corner material is worked in forming the corner, the corner is work hardened, whereby the corner structure is strengthened with respect to bottom 22 and side wall 24 as the corner structure is formed at intermediate element 34.

Whereas in the prior art, the inner surface corresponding to 37 describes a radius of e.g. 0.005 inch (0.127 mm), the inner surface 37 of electrode cans of the invention describe a radius of less than 0.125 mm. A radius of 0.075 mm or less is an improvement over the prior art. A radius of 0.050 mm is good, with 0.025 mm being even better. Preferably the coming together of the inner surfaces 28 and 30 describes a sharp interior corner at 37, whereupon the representation of intermediate section 34 is nominal at locus 37. A "sharp interior corner," means that the radius is substantially zero, or as close to zero as can be made with standard machine tools.

As illustrated in FIGS. 2 and 2A, in the illustrated embodiment, the inner surface 30 of the side wall 24 extends generally perpendicular to the outer surface 26 of bottom 22 of the cathode can. As seen therein, a straight line extension of inner surface 30 intersects the outer surface 26 of the bottom 22 at a locus 29 disposed inwardly of the outer perimeter 27. Correspondingly, the outer perimeter 27 extends radially outwardly of the inner surface 30 of the side wall 24.

The dimension between the opposing arrows 38 (FIG. 2A) defines a force transmitting portion 40 of the bottom 22 extending from locus 29 to outer perimeter 27, and upwardly from the outer surface 26 toward the side wall 24, and which transmitting portion 40 can transmit upwardly directed forces from the outer surface 26 to the side wall 24 in a straight line parallel to the inner surface 30 of side wall 24. The double headed arrow in FIG. 2A illustrates a force 42 applied uniformly across the outer surface 26, including at transmitting portion 40, which force is transmitted to the side wall 24 through the force transmitting portion 40 of the bottom 22 between the outer perimeter 27 and the locus 29, locus 29 being projected from inner surface 30 of side wall 24.

As upwardly directed force 42 is applied to bottom 22 at its outer surface 26, the force is transmitted upwardly in a straight line through the transmitting portion 40 defined by the area defined between opposing arrows 38. As illustrated by the double headed arrow at 42, and the corresponding dashed line 44 extending upwardly from the arrow at 42, such force applies no effective bending moment to the bottom surface 26 with respect to the side wall 24, because there is no effective lever arm between the point where the force is applied at transmitting portion 40 and the side wall 24. Rather, the force travels in a straight line direction indicated by the dashed line 44, which is aligned with the direction of application of the force from the outer surface 26, into the side wall 24.

By contrast, and now referring to FIG. 1A, the inventor herein, by careful inspection, discovered that, in the prior art structure of the cathode can, the outer perimeter of the flat outer surface of the bottom was disposed inwardly of the projected inner surface of the corresponding side wall, the side wall being perpendicular to the bottom wall.

The inventor herein further discovered that a vertically directed force applied to the bottom of the can, even at its outer surface, such as the force applied to the cathode in joining the anode and cathode and crimping the cathode about the anode and seal, was being transmitted upwardly into the side wall along lines extending (i) transverse to the inner surface of the side wall, and (ii) transverse to the direction of application of the vertical force. The corresponding upwardly directed force on the outer surface of the bottom of the cathode can is illustrated in FIG. 1A by the double headed arrow at the outer perimeter of the can bottom. A straight transverse line transmitting that force into the side wall is indicated by the transverse dashed line extending from the double headed arrow at the outer surface of the bottom, (at the outer perimeter) through the corresponding intermediate element and into the side wall. The horizontal component of the line of force represents a lever arm between the bottom of the can and the side wall. Thus, an upwardly directed force on the bottom of the prior art can, as indicated by the double headed arrow in FIG. 1A, exerts a bending moment on the bottom of the can.

Conventional physics analysis teaches that the bending moment is the product of (a) the magnitude of the force applied and (b) the lever arm over which the force is applied. The lever arm is illustrated in FIG. 1A by the opposing arrows at the bottom of the can. Thus, as suggested by the parallel dashed lines along the bottom of the can in FIG. 1A, when force is applied against the bottom of a cathode can of the prior art, the bending moment urges the bottom of the can to deform upwardly. Where, as in closure of the cell, and crimping of the cathode can inwardly on the seal and the anode can, the upwardly directed force is great enough, the bottom of the cathode can may be permanently deformed/displaced by the upwardly directed force, as shown in FIGS. 1 and 1A.

Figure 2B:
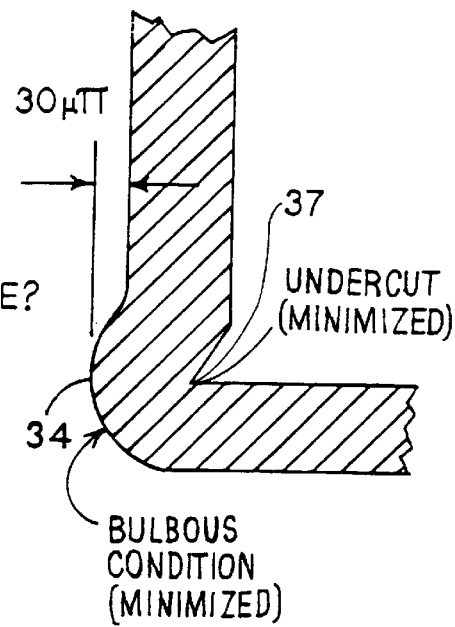
FIG. 2B is an enlarged fragmentary cross-section, showing the corner structure of the cathode can of the invention illustrated in FIG. 2 under actual conditions.

FIG. 2B shows the cathode can of the invention as it is often formed under actual conditions, wherein intermediate element 34 bulges outwardly, and locus 37 forms a slight undercut in inner surface 30.

Figure 3:
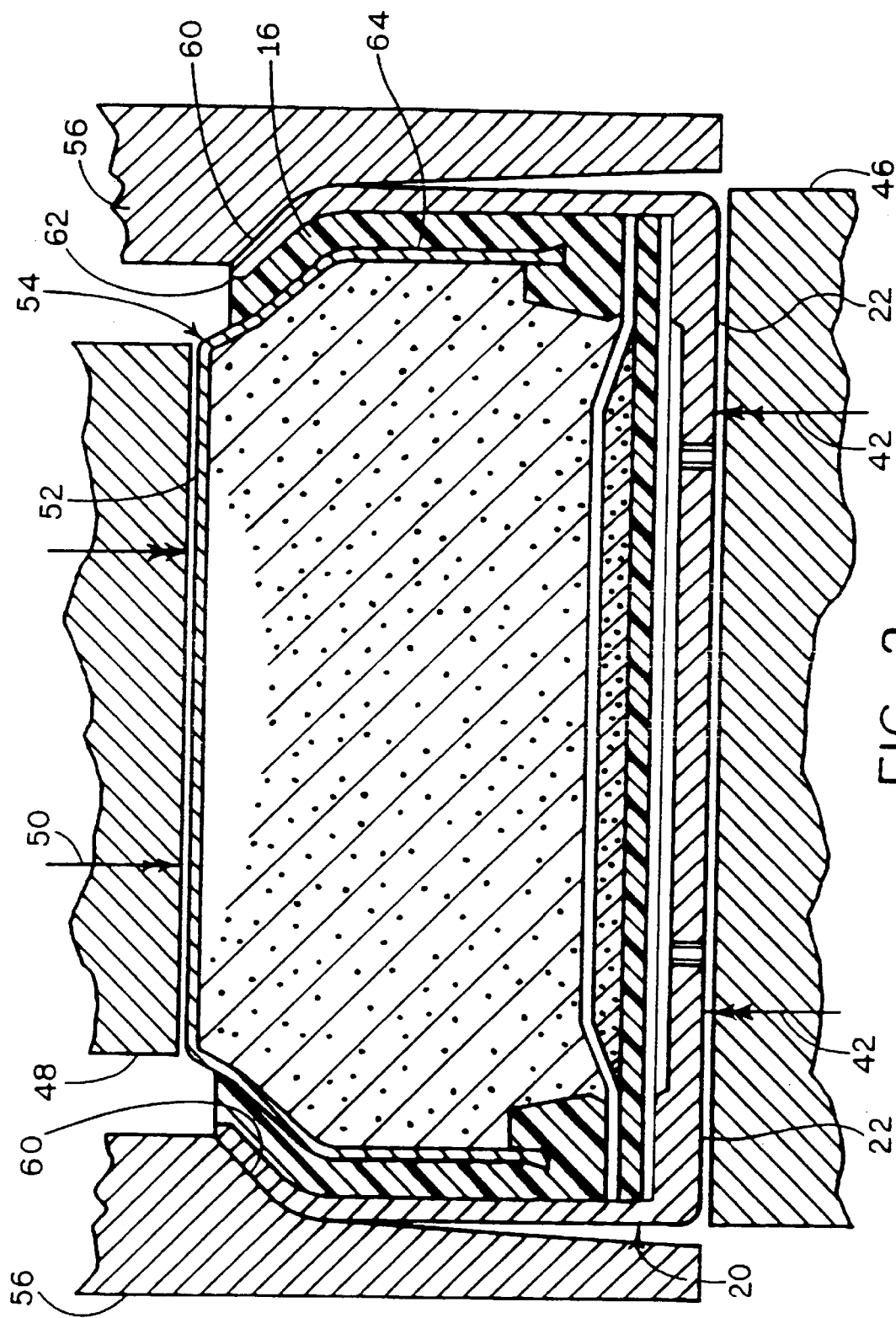
FIG. 3 illustrates the die arrangement, and the final stage of the method used to bring together the anode, the cathode, and the seal, to thereby close and crimp the respective elements in assembly of the electrochemical cell.

FIG. 3 illustrates the die arrangement, and the final stage of the process of bringing together the anode, the cathode, and the intervening seal, to close the cell and crimp the distal edges of the cathode side wall about the anode. Referring now specifically to FIG. 3, a closing punch 46 exerts an upwardly directed force 42, indicated by the double headed arrows, against the bottom 22 of the cathode can 20. An opposing ejector punch 48 exerts an opposing downwardly directed force 50 of lesser magnitude, indicated by the double headed arrows, against the top 52 of the anode can 54. Closing die 56 generally surrounds the cavity 58 in which the cell is closed and crimped.

As the closing punch 46 exerts the force 42 indicated by arrows, thus urging the cathode can against the anode can and the seal, the cathode can is moved into the closing die 56 and against the transverse crimping lands 60 of the die. At the same time, the ejector punch 48 exerts its opposing force 50 against the anode. In order for the closing punch 46 to force the cathode can closed, it must exert sufficient force to form the crimp on the distal edges 62 of the side wall 24, thus gripping anode can 54 and seal 16 in closure of the cell 10, as well as sufficient force to overcome the resistance of the opposing force 50 on the anode can.

The force 50 on the anode can has at least two purposes. First, the force 50 on the anode can helps stabilize the anode can while the cell is being closed. Second, and referring to FIG. 1A, the force 50 is exerted through seal 16 against the inner surface 28 of the bottom 22 of the cathode can, and thus generally opposes any bending moment which may be imposed on the bottom 22 of the cathode can, thus tending to reduce the deformation suggested in FIG. 1A. The magnitude of the force 50 is generally determined with respect to the need to oppose the bending moment, as the bulk of the force 42 on the cathode can can be absorbed by the stationary closing dies 56. Thus, to the extent the need to oppose bending moment on the cathode can is reduced, the magnitude required of the force 50 on the anode can is correspondingly reduced.

The effectiveness of the force 50 in attenuating the tendency of the bottom of the cathode can to deform is related to the magnitudes of the respective forces 42 and 50, the lever arms over which they are applied relative to the respective can side walls, and the thickness of the material making up bottom 22. To the extent the thickness of the material is reduced, e.g. to correspondingly increase usable interior volume, the contribution of the metal thickness to resisting bending forces is similarly reduced. Further, the lever arm between the anode can side wall and the cathode can side wall is also reduced when can wall thickness is reduced.

In order for the opposing force 50 to remain effective in stabilizing the bottom 22 as the cell is closed, the magnitude of the force 50 must be increased to offset any reduced contributions of the lever arm and the bottom thickness. But as the thickness of the side wall e.g. 63 of the anode can is reduced, the capacity of the side wall 63 to tolerate the downward force 50 is reduced. Indeed, the normal 500 lbs of force conventionally used with an anode side wall thickness of 0.008 inch (0.203 mm) can cause the anode can to collapse during the closing process where the thickness of the side wall is reduced to less than 0.008 inch (0.203 mm).

Accordingly, if the thickness of the side walls 24, 63 are to be reduced, the magnitude of the force 50 must be reduced, whereby some other mechanism must be provided for controlling or eliminating the tendency of the bottom of the cathode can to deform upwardly.

Referring again to FIG. 2A, it is noted that the force transmitting portion 40 is displaced outwardly from the corresponding locus where force is transmitted from the bottom surface of the cathode can in FIG. 1A. Thus, force 42 in FIG. 2A is transmitted from the outer surface 26 of the bottom of the cathode can in a straight line upwardly to the side wall, without imposing any bending moment on the bottom 22. The only bending moment, if any, on the bottom 22 is that corresponding with transferring, to the transmitting portion 40, any force applied to the can inside the inner perimeter of the force transmitting portion 40 e.g. inside the locus defined at 29. Such bending moment, if any, is considerably less than the bending moment applied in FIG. 1A, where all force applied produces a bending moment.

Since force 42 applies little or no effective bending moment on bottom 22, little or no opposing force 50 is needed to correct a bending moment from force 42. A direct result of the outward displacement of the force transmitting portion 40 is thus a reduction in the required magnitude of the opposing force 50, from a magnitude of about 500 lbs using cans of the prior art to a magnitude of about 70 lbs or less, e.g. using otherwise similar cans of the invention. Accordingly, metal strip suitable for forming cathode cans of the invention for use in 675A cells may be preferably about 0.150 mm to about 0.180 mm thick, more preferably about 0.160 mm to about 0.170 mm thick, most preferably about 0.165 mm thick. Metal strip suitable for forming cathode cans of the invention for use in size 13A cells may be preferably about 0.110 mm to about 0.130 mm thick, more preferably about 0.115 mm to about 0.125 mm thick, most preferably about 0.119 mm thick.

The retention of the flat configuration at the bottom of the can provides a corresponding increase in the useful volume inside the cell, which translates almost completely to an increase in space which can be filled with additional reactive material.

Returning now to further general description of the cells of the invention, the bottom 22 of the cathode can 20 is perforated therethrough by air ingress holes, also known as air ports 64. The cathode assembly 18 is interposed between the anode 12 and the bottom 22 of the cathode can. Anode 12 is comprised of a mixture of zinc powder and electrolyte, the composition of the electrolyte comprising about 2% by weight zinc oxide, 68% by weight water, and 30% by weight potassium hydroxide.

Figure 4:
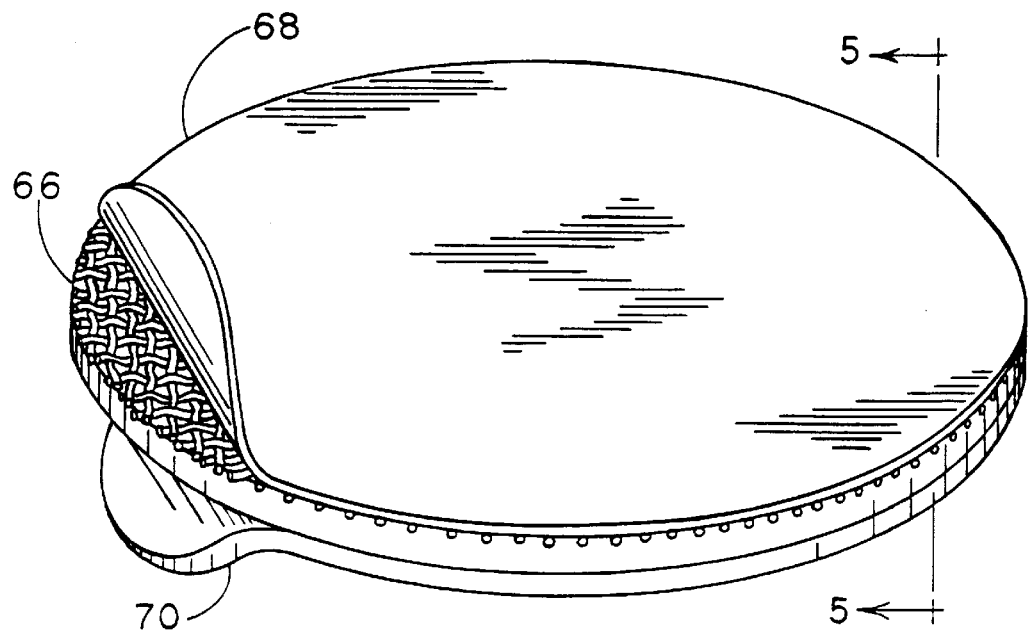
FIG. 4 shows a pictorial view, with parts rotated for visibility, of the cathode assembly used in the electrochemical cell shown in FIG. 2.

FIG. 4 shows a perspective view of the cathode assembly used in cells representative of the present invention. Active layer 66 is interposed between barrier layer 68 and air diffusion layer 70. Active layer 66 ranges preferably between about 0.002 and about 0.05 inch thick, and facilitates the reaction between the hydroxyl in the electrolyte and the cathodic oxygen of the air. Barrier layer 68 is a microporous plastic membrane about 0.001 inch thick, typically polypropylene, having the primary function of preventing anodic zinc particles from coming into physical contact with the remaining elements of the cathode assembly 18. Barrier layer 68 however, does permit passage of hydroxyl ions and water therethrough. Air diffusion layer 70 is preferably a micro-porous hydrophobic polymeric material such as a polytetrafluoroethylene (PTFE) membrane about 0.004 inch thick, which permits passage of air therethrough. The air diffusion layer 70 may be used to limit the current density produced by the cell to a desired maximum. Air diffusion layer 70 is further impervious to battery electrolyte.

Figure 5:
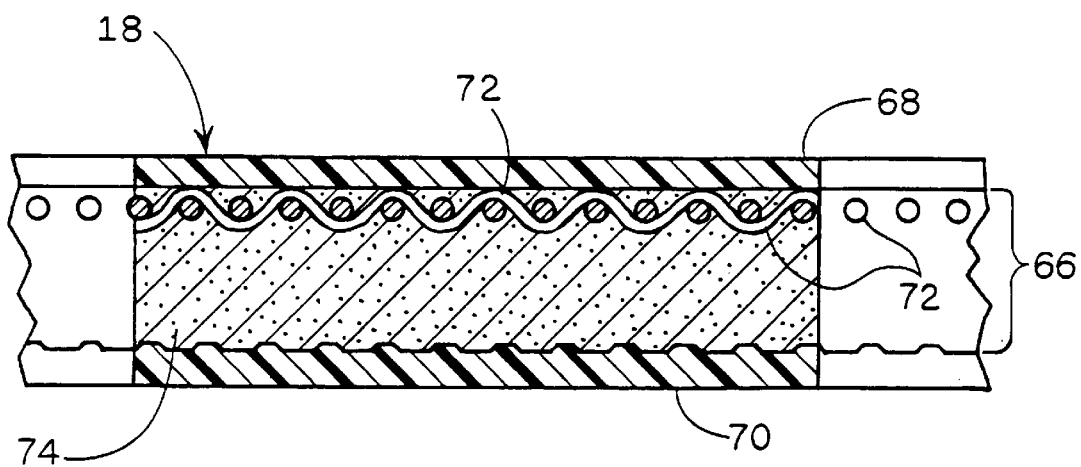
FIG. 5 shows an enlarged fragmentary cross-section of the cathode assembly of FIG. 4, taken at 5—5 of FIG. 4.

FIG. 5 is an enlarged perspective view of the cathode assembly 18. Active layer 66 is further comprised of connecting substratum capable of being connected to electrical circuitry, namely conductive woven nickel wire layer 72. Carbon, indicated at 74, preferably forms a matrix surrounding the conductive layer 72 of nickel wire. Nickel is preferred for layer 72 because nickel exhibits little or no corrosion in the alkaline environment of the zinc-air cell, and also because nickel is an excellent electrical conductor.

The electrode cans (e.g. cathode can 20) of the invention can be fabricated using a conventional sheet metal press. For example, a cathode can for a size 13A zinc air cell was made as follows.

EXAMPLE

Nickel plated steel 0.008 inch thick was obtained from Hille & Muller, Dusseldorf, Germany. The metal was fabricated into cathode cans using a 45 Ton press having three draw stations. Prior to fabrication in the press, the metal was lubricated with forming lubricant. At Draw Station No. 1, a cup representing a rough approximation of the finished can was stamped in the metal strip. At Draw Station No. 2, the cup was further worked, to more closely approach the dimensions of the finished can. At Draw Station No. 3, the final can dimensions were generated. After Draw Station No. 3, the workpiece/cup was separated from the metal strip and trimmed, to complete fabrication of the cathode can.

Figure 6A:
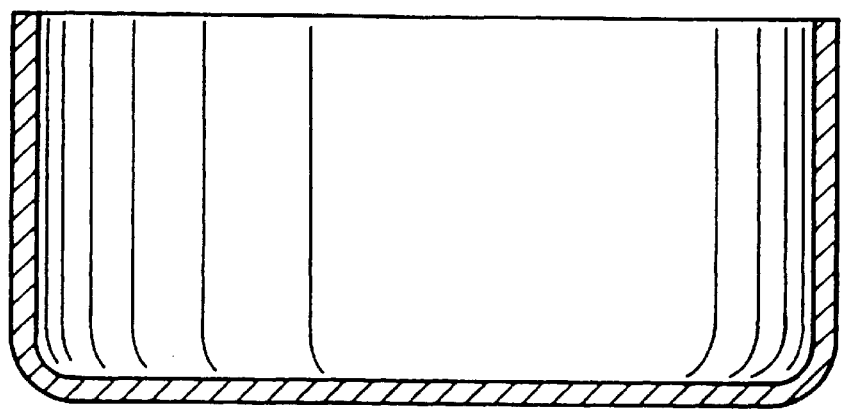
FIGS. 6A–6C illustrate stages of fabrication of the electrode can of the invention.
Figure 6B:
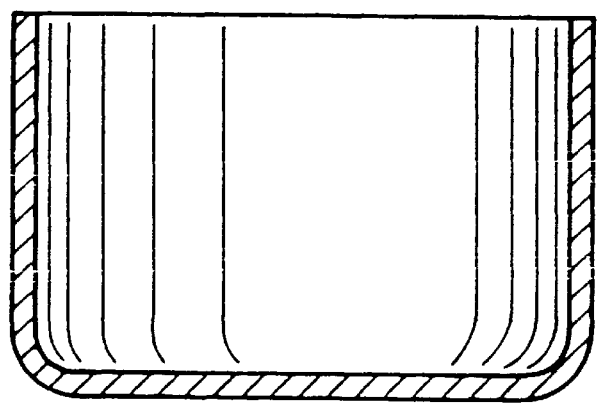
Figure 6C:
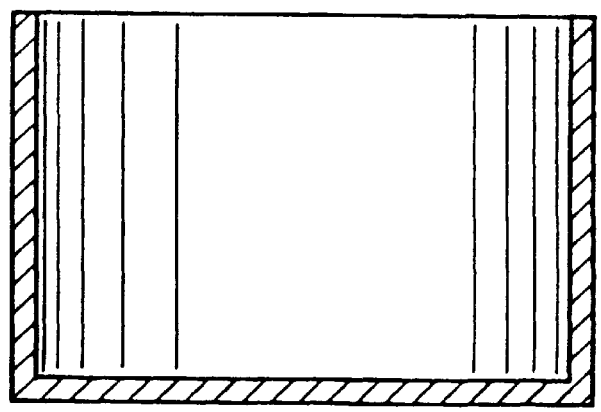

FIGS. 6A–6C illustrate the progressive formation of the workpiece at the three draw stations. Following Table 1 illustrates the conditions of the workpiece at the conclusion of operation at each draw station.

"O/Dia" means outside diameter of the workpiece.

"I/Dial" means inside diameter of the workpiece.

"Depth" refers to the inside depth of the workpiece.

"Radius" refers to the radius described by the surface corresponding to inner surface 37 of the intermediate element 34 at the respective draw stations.

TABLE 1

| Station No. | O/Dia | I/Dia | Depth | Radius |
|---|---|---|---|---|
| 1 (FIG. 6A) | 9.80 mm | 9.40 mm | 3.76 mm | .800 mm |
| 2 (FIG. 6B) | 8.54 mm | 8.14 mm | 4.82 mm | .400 mm |
| 3 (FIG. 6C) | 7.75 mm | 7.35 mm | 5.43 mm | Sharp |

A suitable cathode assembly 18 was placed in the cathode can. A suitable anode, including anode can and anode material was selected. The anode, a suitable seal 16, and the cathode were placed in juxtaposed position with respect to each other and the anode and seal were urged part-way into the cathode can, to thus partially close the cell, and prepare it for final closure and sealing.

The partially closed cell was then placed in a closing assembly including a closing punch 46, closing die 56, and ejector punch 48, all as illustrated in FIG. 3. Closing die 56 then applied closing force 42 against the outer surface 26 of the bottom 22 of the cathode can while ejector punch 48 applied opposing force 50 of lesser magnitude. Under the influence of forces 42 and 50, the cathode, the anode, and the seal moved together into the closing die 56 and the cathode was fully seated over the anode. As the cathode, the anode, and the seal moved into the closing die, the distal edge 62 of cathode side wall 24 was engaged by the crimping lands 60 of the die 56, crimping the edge 62 inwardly against seal 16 and anode can 54 and thus closing and sealing the cell 10. By the time the cell had been so closed, the force 42 applied by the closing punch 46 reached about 1000 lbs, and the opposing force 50 reached about 70 lbs. The resulting cell was structurally sound. The bottom was not dished. All components met desired dimension specifications.

Given the reduced force 50 on the anode can, the structural requirements for tolerating compressive stress on the can are reduced. As a result, thinner metal can be used for fabricating the can 10, whether cathode can or anode can, while meeting the reduced stress requirements. For example, for size 675A cells, the metal can be reduced at least to 0.0065 inch (0.165 mm), and for size 13A cells, the metal can be reduced at least to 0.0047 inch (0.119 mm).

The above structural improvements can be practiced, making improved cans using a variety of metal structures. Plating materials and ductility are the important characteristics of the electrode can. The can may be formed of virtually any metal that is plated or clad with the appropriate metal, such appropriate metal having a hydrogen overvoltage similar to that of the corresponding electrode and being insoluble at high pH's (or in the presence of electrolyte), the metal plating or cladding being in chemical communication via the electrolyte with the electrode material, if not in direct physical contact therewith.

Optionally, the can may be formed entirely of a metal or alloy having a hydrogen overvoltage similar to that of the electrode (as opposed to plating or cladding the can). In addition to nickel, stainless steel, palladium, silver, platinum, and gold may be suitable plating, cladding, or can materials. Steel strip plated with nickel and nickel alloy is generally used because the cost is low, and because pre-plated steel strip, which generally requires no post-plating processes, is commercially available. The metal in the can must be ductile enough to withstand the drawing process, and strong enough to withstand the cell crimping and closure process.

Cathode cans, for example, may be made of cold-rolled steel plated with nickel. Steel strip pre-plated with nickel can also be used. Cathode cans may also be formed from cold-rolled mild steel, with at least the inside portions of the cans being subsequently post plated with nickel. Other specific examples of materials for cathode cans include nickel-clad stainless steel; nickel-plated stainless steel; INCONEL (INCO alloy of nickel, a non-magnetic alloy); pure nickel with minor alloying elements (NICKEL 200 and related family of NICKEL 200 alloys such as NICKEL 201, etc.), all available from Huntington Alloys, a division of INCO, Huntington, W. Va. Some noble metals may also find use as plating, cladding, or can metals, including steel strip plated with nickel, and mild steel strip subsequently plated with nickel after forming the can.

As illustrated above, the can is readily made using a press having three draw stations. The can is also readily made using a press having two stations. Other methods of forming the can, having the inventive configuration shown herein, will be readily apparent to those skilled in the art.

The process described above for making a cathode can is also useful for making corresponding anode cans having related improvements in physical properties. Such making of anode cans would, of course, be practiced using metal structures compatible with the polarity of the anode. For example, an anode can is preferably plated with copper on its inner surface. Copper has a hydrogen overvoltage similar to that of zinc. An anode can is readily formed of stainless steel wherein the inner surface is plated with copper, and the outer surface is plated with nickel. Such can is available with a prior art conventional intermediate element structure as in FIG. 1A from, for example, Hitachi, Japan.

Thus, the invention contemplates making an electrochemical cell using a cathode can having the outwardly displaced force transmitting portion 40, in combination with an anode can having a correspondingly outwardly displaced force transmitting portion on the closed top of the anode can. The invention also contemplates, as illustrated in FIGS. 2 and 2A, using a cathode can of the invention in combination with an anode can of the prior art, wherein the conventional corner radius defines the force transmitting portion inwardly of the inner side wall of the anode can.

Those skilled in the art will now see that certain modifications can be made to the articles, apparatus, and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. An electrode can for use in an electrochemical cell, said electrode can comprising:

(a) a bottom, having a first inner surface, and a first outer surface;

(b) at least one side wall extending upwardly, away from said bottom, said at least one side wall having a second outer surface and a second inner surface, said second inner surface extending substantially perpendicular to the first outer surface such that a straight line extension of said second inner surface intersects said first outer surface at a locus disposed inwardly of a first outer surface perimeter; and (c) an intermediate element of said can extending between said bottom and said at least one side wall, said intermediate element comprising a third outer surface and a third inner surface, said third outer surface extending between said outer perimeter of said first outer surface of said bottom and said second outer surface of said at least one side wall, said third inner surface extending between said first inner perimeter of said first inner surface and said second inner surface of said at least one side wall, said third outer surface bulging outwardly from said at least one side wall, said electrode can having been fabricated prior to incorporation of said electrode can into an electrochemical cell.

2. An electrode can as in claim 1, said third inner surface having an undercut with respect to, and extending outwardly of, said second inner surface.

3. An electrode can as in claim 2, said third inner surface describing a curvature between said first and second inner surfaces having an average radius of less than 0.125 mm.

4. An eletrode can as in claim 1, said at least one side wall having an average thickness from about 0.110 mm to about 0.130 mm.

5. An electrode can as in claim 1, said at least one side wall having an average thickness no greater than 0.125 mm.

6. An electrode can as in claim 1, said at least one side wall having an average thickness from about 0.115 mm to about 0.125 mm.

7. An electrode can as in claim 1, said at least one side wall having an average thickness of about 0.119 mm.

8. An electrode can as in claim 1 wherein said intermediate element is work-hardened with respect to said bottom and said at least one side wall.

9. An electrode can as in claim 1, said third inner surface describing a curvature between said first and second inner surfaces having an average radius of less than 0.075 mm.

10. An electrode can as in claim 1, said third inner surface describing a curvature between said first and second inner surfaces having an average radius of less than 0.050 mm.

11. An electrode can as in claim 1, said third inner surface describing a curvature between said first and second inner surfaces having an average radius of less than 0.025 mm.

12. An electrode can as in claim 7, said third inner surface describing a sharp interior corner with respect to said second inner surface of said at least one side wall.

* * * * *